US012807778B2

(12) United States Patent
Roper et al.

(10) Patent No.: US 12,807,778 B2
(45) Date of Patent: Nov. 24, 2026

(54) HIERARCHICAL BUOYANT MATERIALS

(71) Applicant: The Boeing Company, Chicago, IL (US)

(72) Inventors: Christopher S. Roper, Oak Park, CA (US); William Evans O'Connor, Santa Monica, CA (US); Adam Franklin Gross, Santa Monica, CA (US); Brian Christopher Grubel, Vienna, VA (US); James Harold Kober, Ashburn, VA (US)

(73) Assignee: The Boeing Company, Arlington, VA (US)

( * ) Notice: Subject to any disclaimer, the term of this patent is extended or adjusted under 35 U.S.C. 154(b) by 1099 days.

(21) Appl. No.: 17/934,253

(22) Filed: Sep. 22, 2022

(65) Prior Publication Data

US 2024/0101780 A1 Mar. 28, 2024

(51) Int. Cl.

| | |
|---|---|
| ***C08J 9/236*** | (2006.01) |
| ***B29C 70/66*** | (2006.01) |
| ***B63B 22/00*** | (2006.01) |
| ***C08J 9/32*** | (2006.01) |
| ***C08K 7/26*** | (2006.01) |
| ***C08K 7/28*** | (2006.01) |
| *B29K 105/16* | (2006.01) |

(52) U.S. Cl.

CPC ............... *C08J 9/236* (2013.01); *B29C 70/66* (2013.01); *B63B 22/00* (2013.01); *C08J 9/32* (2013.01); *C08K 7/26* (2013.01); *C08K 7/28* (2013.01); *B29K 2105/165* (2013.01); *C08J 2205/048* (2013.01); *C08J 2300/00* (2013.01)

(58) Field of Classification Search

CPC ........ C08J 9/236; C08J 9/32; C08J 2205/048; C08J 2300/00; B29C 70/66; B63B 22/00; C08K 7/26; C08K 7/28; B29K 2105/165; B63G 8/14

See application file for complete search history.

(56) References Cited

U.S. PATENT DOCUMENTS

| | | | | |
|---|---|---|---|---|
| 3,585,157 | A * | 6/1971 | Beck | C08J 9/32 521/137 |
| 3,622,437 | A * | 11/1971 | Hobaica | B29C 70/66 473/118 |
| 6,058,979 | A | 5/2000 | Watkins | |
| 6,284,809 | B1 | 9/2001 | Plummer et al. | |
| 9,216,524 | B1 | 12/2015 | Cook et al. | |
| 9,314,996 | B1 | 4/2016 | Wedding et al. | |
| 2013/0025195 | A1 | 1/2013 | Wuster | |

OTHER PUBLICATIONS

Extended European Search Report, Application No. 23199151.4, Mailed Feb. 26, 2024, 6 Pages.

* cited by examiner

*Primary Examiner* — John M Cooney
(74) *Attorney, Agent, or Firm* — Massey Bean & Lewis

(57) ABSTRACT

Disclosed are hierarchical buoyant materials comprising porous components having multiple length scales that provide reduced density, higher strength, and improved buoyancy. The hierarchical buoyant materials include components having at least two length scales including a first porous material having elements characterized by a first linear length scale and a second porous material having elements characterized by a second linear length scale. The first porous material includes hollow microspheres, and the second porous material provides low effective density via geometrical arrangements. The second linear length scale is substantially different than the first linear length scale in terms of size, e.g., diameter, length, or distance. The second porous material is packed between the first porous material resulting in a combined material having a higher packing fraction than either the first porous material or the second porous material alone to provide reduced density, higher specific strength, and improved buoyancy per unit volume.

20 Claims, 6 Drawing Sheets

HIERARCHICAL BUOYANT MATERIALS

FIELD

Figure 1:
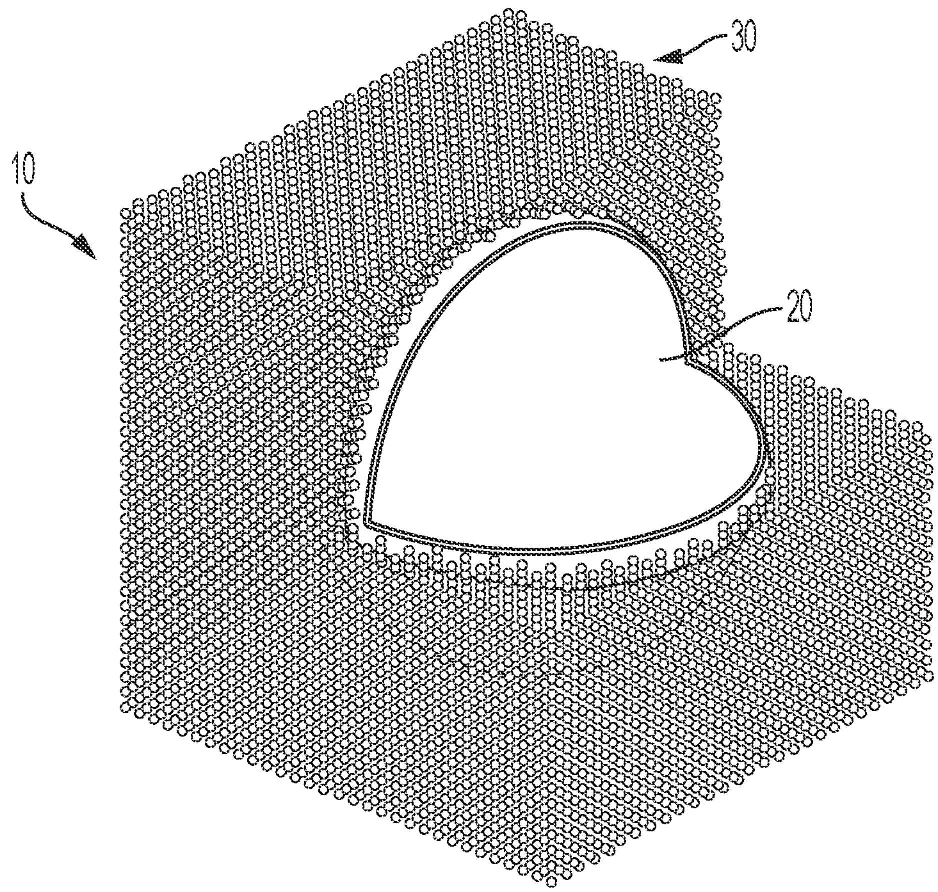

Examples generally relate to hierarchical buoyant materials. More particularly, examples relate to systems, apparatuses and methods for buoyant materials comprising porous components having multiple length scales that provide reduced density, higher strength, and improved buoyancy.

BACKGROUND

Buoyancy solutions, such as syntactic foam, are used to make subsea platforms neutrally buoyant such that the dynamic range of a variable ballast system is maximized or that the required energy is minimal to keep the vehicle at a given depth during transit. Subsea packages, such as cabled observatory nodes or other unattended sensors, can also benefit from buoyancy solutions to improve ease of deployment. Conversely, packages that are very heavy subsea are difficult to maneuver and require high strength lift lines and robust deployment vessels. Further, subsea vehicles and packages are often volume limited in order to meet component shipping requirements. Therefore, there is typically limited volume available to account for buoyancy compensating materials. As a result, there is ever-increasing demand to develop lower density materials that can withstand the pressures of operating subsea and maximizing utilization of any available volume. These factors drive higher geometric complexity of buoyancy compensating materials to fit within smaller and irregular pockets of space on a platform. This, in turn, increases total unique part quantity, upfront engineering cost, manufacturing cost, and assembly time during production. It also complicates the servicing of the platform—as many small parts often need to be removed to access parts of the system. Consequently, novel innovations in higher buoyant force density, reduced costs, and accelerated lead times are desired.

SUMMARY

Disclosed are hierarchical buoyant materials comprising porous components having multiple length scales that provide reduced density, higher strength, and improved buoyancy.

In accordance with one or more embodiments, a hierarchical buoyant material may comprise a first porous material and a second porous material. The first porous material comprises elements characterized by having a first linear length scale, and comprising hollow microspheres. The second porous material comprises elements characterized by having a second linear length scale and provides a low effective density via geometrical arrangements. The second linear length scale is substantially different than the first linear length scale, and the second porous material has a size that is either smaller or larger than the first porous material. The first or second porous material having a smaller linear length scale is packed between the other of the first and second porous material having a larger linear length scale. The hierarchical buoyant material has a higher packing fraction than either the first porous material or the second porous material alone.

In accordance with one or more embodiments, a method of fabricating a hierarchical buoyant material is disclosed. The method comprises providing a first porous material which comprises elements characterized by having a first linear length scale, providing a second porous material which comprises elements characterized by having a second linear length scale, and packing the first or second porous material having a smaller linear length scale between the other of the first or second porous material having a larger linear length scale resulting in the hierarchical buoyant material having a higher packing fraction than either the first porous material or the second porous material alone. The first porous material comprises hollow microspheres. The second linear length scale is substantially different than the first linear length scale, and the second porous material has a size that is either substantially smaller or substantially larger than the first porous material.

The features, functions, and advantages that have been discussed can be achieved independently in various embodiments or may be combined in yet other embodiments further details of which can be seen with reference to the following description and drawings.

DRAWINGS

The various advantages of the embodiments of the present disclosure will become apparent to one skilled in the art by reading the following specification and appended claims, and by referencing the following drawings, in which:

FIG. 1 shows a schematic representation of one example of a hierarchical buoyant material using hollow glass microspheres and mesoporous silica as porous materials.

Figure 2:
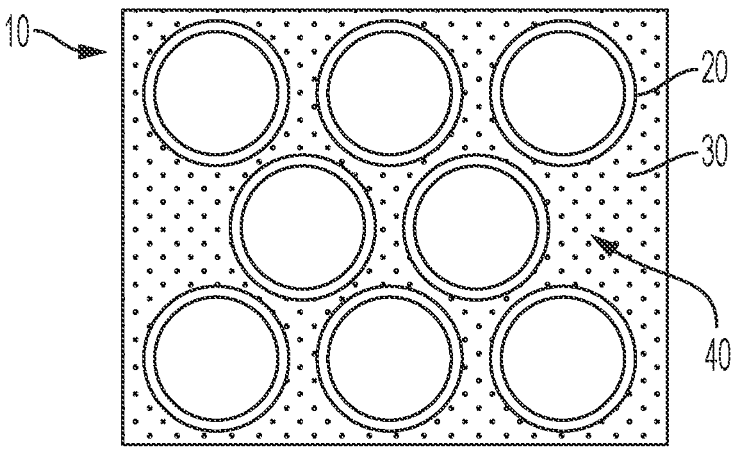

FIG. 2 presents an illustrative cross-section schematic of one hierarchical buoyant material example using mesoporous silica and hollow glass microspheres in an epoxy matrix.

Figure 3:
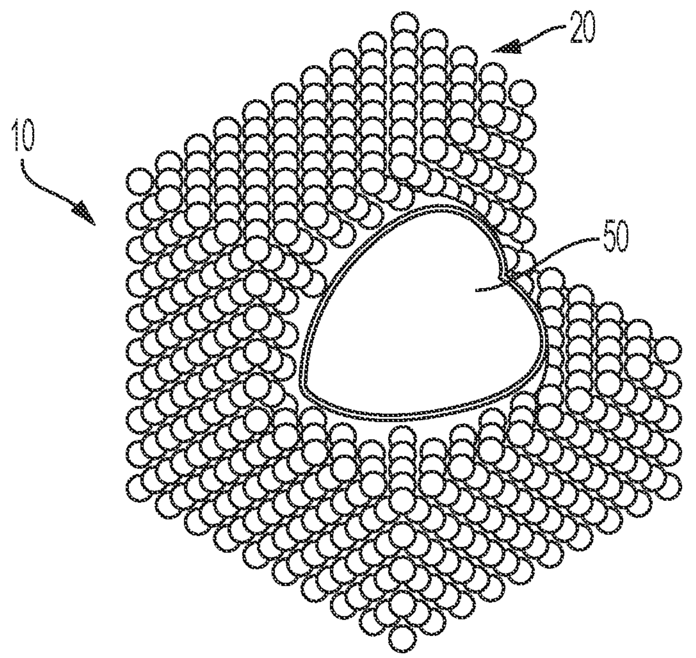

FIG. 3 is a schematic illustration of an exemplary example of a hierarchical buoyant material using hollow alumina spheres packed in between hollow glass microspheres.

Figure 4:
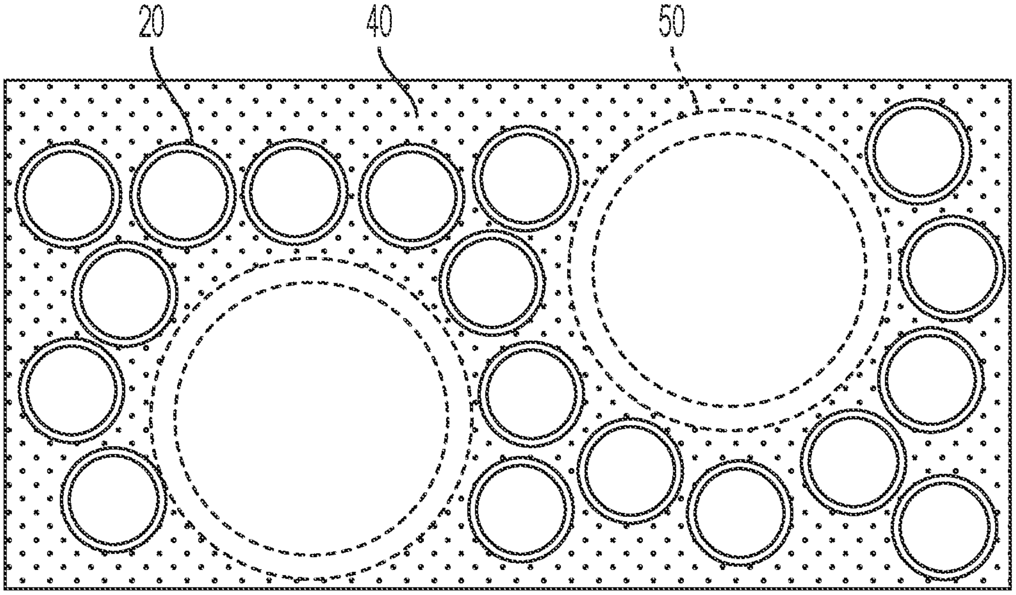

FIG. 4 presents an illustrative cross-section schematic of one hierarchical buoyant material example using hollow alumina spheres and hollow glass microspheres in an epoxy matrix.

Figure 5:
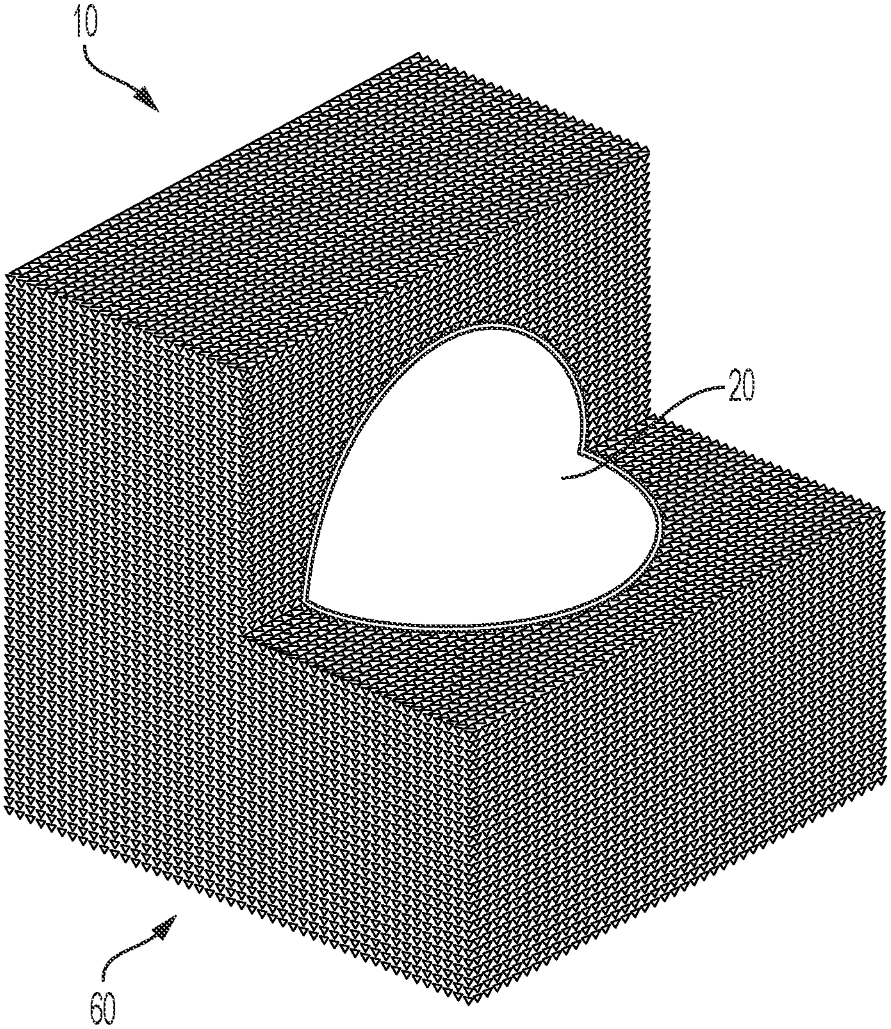

FIG. 5 presents a schematic of one example using ultrafine closed-cell foam and hollow glass microspheres.

Figure 6:
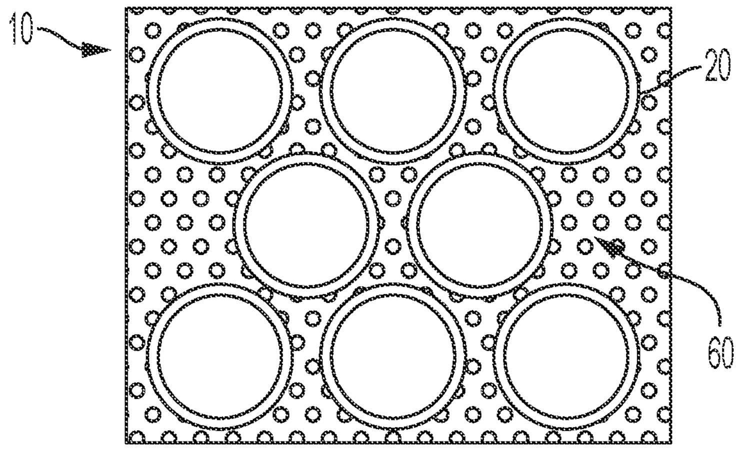

FIG. 6 shows a cross-section schematic of one hierarchical buoyant material example using ultrafine closed-cell foam.

Figure 7:
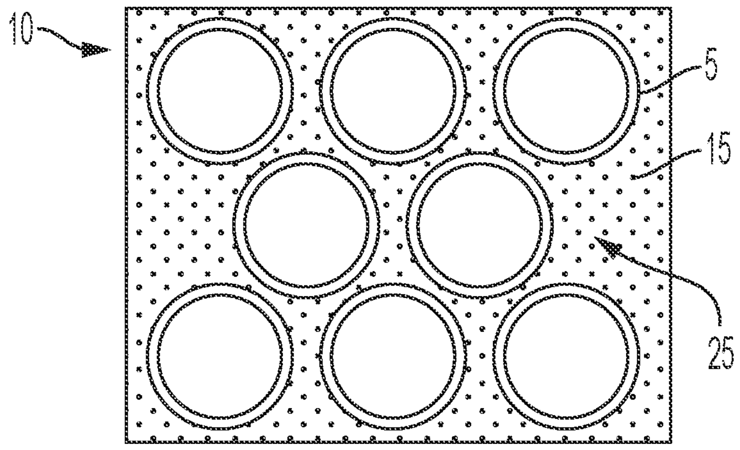

FIG. 7 presents a schematic of one generic example of a hierarchical buoyant material comprising a first porous material, a second porous material, and a continuous phase matrix.

Figure 8A:
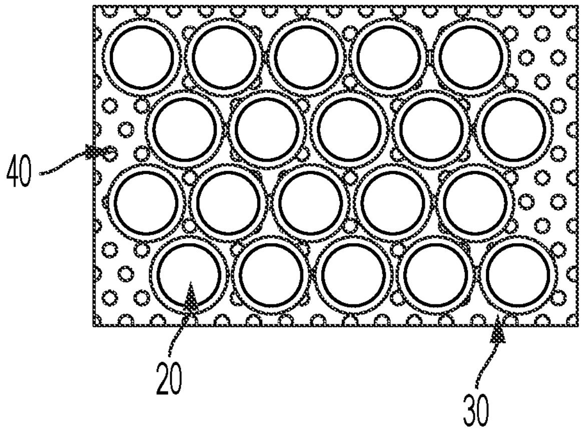

FIG. 8A presents an illustrative cross-section schematic of a hierarchical buoyant material of Example 1.

Figure 8B:
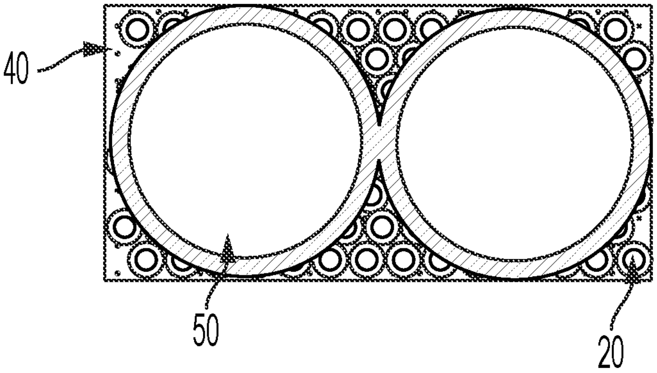

FIG. 8B presents an illustrative cross-section schematic of a hierarchical buoyant material of Example 2.

Figure 8C:
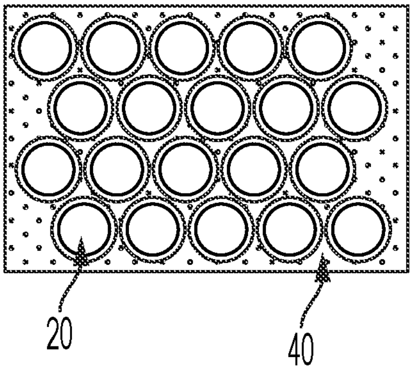
FIG. 8C PRIOR ART

FIG. 8C presents an illustrative cross-section schematic of known state of the art (SoA) syntactic foam.

Figure 9:
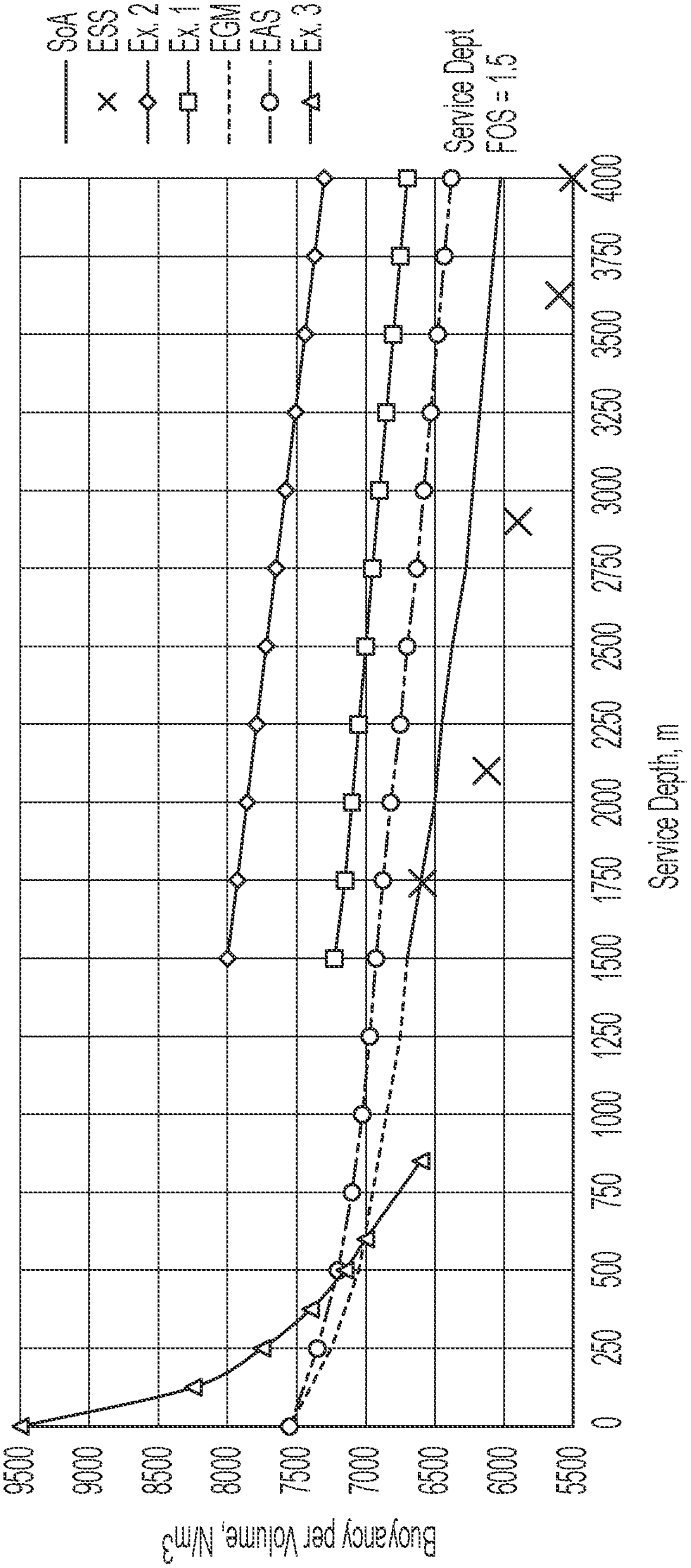

FIG. 9 is a comparison of predicted results of Examples of hierarchical buoyant materials of the present disclosure to known state of the art (SoA) syntactic foam.

In the figures, relative sizes as shown are arbitrary and are not meant to convey preferred dimensions or sizes.

Accordingly, it is to be understood that the examples of the disclosure herein described are merely illustrative of the application of the principles of the disclosure. Reference herein to details of the illustrated examples is not intended to limit the scope of the claims, which themselves recite those features regarded as essential to the disclosure.

DESCRIPTION

In accordance with one or more examples, provided are hierarchical buoyant materials and methods of fabricating same. Some examples relate to systems, apparatuses and methods for hierarchical buoyant materials comprising porous components having multiple length scales that provide reduced density, higher strength, and improved buoyancy. Porous materials are generally classified based on pore size into three categories: microporous (less than 2 nm), mesoporous (2-100 nm), and macroporous (greater than 100 nm). Hierarchical or hierarchically structured porous materials as in the present disclosure are materials wherein the structure contains pores with a porous hierarchy that spans multiple length scales, from micro- to meso- to macrospheres. The phrase "linear length scale", for purposes of this disclosure, refers to a diameter of spherical features, feature center-to-center distance, or spacing between features.

In some examples of the present disclosure, the hierarchical buoyant material comprises (a) a first porous material which comprises elements characterized by having a first linear length scale, and comprising hollow microspheres; and (b) a second porous material that comprises elements characterized by having a second linear length scale, wherein the second linear length scale is substantially different from the first linear length scale in terms of size, e.g., diameter, length, or distance, and the second porous material has a size that is either smaller or larger than the first porous material. The second porous material provides low effective density via geometrical/architected arrangements. Such geometrical/architected arrangements include, but are not limited to, large porous hollow spheres packed in a face-centered cubic, body-centered cubic, or single cubic lattice, with smaller spheres residing in the open spaces between the larger porous hollow spheres. The first or second porous material having the smaller linear length scale is packed between the other of the first and second porous material having the larger linear length scale such that the hierarchical buoyant material comprising the first and second porous materials has a higher packing fraction than either the first porous material or the second porous material alone.

The hierarchical buoyant material of the present disclosure provides reduced density, higher specific strength (strength/density), and improved buoyancy per unit volume of, for example, at least 10%, at least 20% or at least 30% when compared to known syntactic foam. As used herein, buoyancy per unit volume of material can be calculated using the formula: (density of water−density of foam)× gravitational acceleration, wherein gravitational acceleration—9.81 $m/s^2$. The units of buoyancy per unit mass are $N/cm^3$. The density of water is relatively constant, and therefore, a lower density foam yields higher buoyancy.

In certain examples, the first porous material comprises elements or cells. These elements or cells are characterized by a linear length scale, e.g., the average diameter of hollow microspheres in a packed bed of spheres. The first porous material can have a diameter of about 5 to about 120 microns, 10 to about 100 microns, 10 to about 75 microns, or from about 20 to about 65 microns. The density of the first porous material is <1 $g/cm^3$. In some examples the density of the first porous material is <0.7 $g/cm^3$ or <0.4 $g/cm^3$. In some aspects, the first porous material comprises hollow microspheres. Generally, the term "microsphere" refers to a spherical particle having a diameter in certain micrometer ranges, typically from about 1 micron to about 10,000 microns but does not include a nanoporous foam. In the present disclosure, hollow microspheres of the first porous material have a diameter of about 5 to about 120 microns, 10 to about 100 microns, 10 to about 75 microns, or from about 20 to about 65 microns and can be selected from glass, ceramic, or polymer hollow microspheres and combinations, thereof. The walls of the hollow microspheres have a porosity of less than about 3 volume %.

In at least one example of the hierarchical buoyant material of the present disclosure, the first porous material comprises a packed bed of hollow glass microspheres, hollow ceramic microspheres, or hollow polymer microspheres. Hollow glass microspheres include, but are not limited to, silicon dioxide glass, soda-lime glass, borosilicate glass, and combinations thereof. Hollow glass microspheres (HGMS) may also be referred to as microballoons, and may typically include, but are not limited to, a sodalime-borosilicate blend. One commercial provider of hollow glass microspheres suitable for the first porous material of the hierarchical buoyant materials of the present disclosure is 3M™.

Suitable hollow ceramic microspheres include, but are not limited to, alumina, silicon carbide, silicon oxycarbide, silicon nitride, silicon oxynitride, and silicon oxy carbo nitride. Hollow ceramic microspheres may also be a combination of two ceramics, such as a ceramic particulate filler and a ceramic matrix around the filler. Suitable hollow polymer microspheres include, but are not limited to, polymers or copolymers comprising polyethylene (PE), polypropylene (PP), polymethylmethacrylate (PMMA), polystyrene (PS), polyurethane, polyepoxide, polyamideimide, nylon, polyether ether ketone (PEEK), polyether ketone ketone (PEKK), and polyetherimide (e.g., UTEM™). Additionally, the walls of hollow polymer microspheres may be filled with silica, silicon carbide, or alumina particles that are from 20 nm to 50 μm in diameter or from 50 nm to 6 μm in diameter to increase stiffness and decrease shrinkage of the ceramic during firing. Such materials for the first porous materials are commercially available.

The second porous material comprises elements or cells which are characterized by a second linear length scale. The second linear length scale is substantially different from the first linear length scale. The second linear length scale may be substantially different from the first linear length scale in size, e.g., diameter, length, or distance. The second linear length scale of the second porous material is either substantially larger, for example, at least 5 times greater or at least 10 times greater, or substantially smaller, for example, at least 5 times smaller or at least 10 times smaller than the linear length scale of the first porous material. The density of the second porous material is <1 $g/cm^3$. In some examples the density is <0.7 $g/cm^3$ or <0.4 $g/cm^3$.

The hierarchical buoyant material comprising the first porous material and the second porous material of the present disclosure includes smaller holes within larger holes. In some examples, the smaller material (e.g., smaller holes) has a diameter of about a non-zero number or about 10 nm to about 15 μm, or a non-zero number or about 10 nm amount to about 2 μm. In certain examples, the larger material (e.g., larger holes) has a diameter of about 100 μm to about 10,000 μm or more, or about 300 μm to about 10,000 μm or more, about 650 μm to 10,000 or more. In some aspects, the second porous material comprises materials that can achieve low effective densities through geometrical/architected arrangements via (1) hollow spheres/bubbles, (2) open-cell pore volumes which are capillarily inaccessible to the continuous phase matrix (in other words, contained in a filler and sealed from access to the outside environment by the matrix) or (3) closed-cell pore volumes. In some examples, the geometrical/architected arrangements include, but are not limited to, large porous hollow ceramic spheres packed in a face centered cubic, body centered cubic, or single cubic lattice, with smaller spheres residing in the open spaces between the larger porous hollow ceramic spheres. The second porous material may include, but is not limited to, (i) mesoporous silica (e.g., SBA-15, FDU-12, or MCM-48), (ii) metal-organic framework (MOF) (e.g., MOF-14, MIK-96 (AI), MIL-53 (AI), CALF-25), (iii) zeolite, (iv) ultrafine closed-cell foam (e.g., having a pore size less than 2 μm, or less than 100 nm), or (v) larger hollow spheres (e.g., having a diameter of about 100 μm to about 10,000 μm or more, or about 300 μm to about 10,000 μm or more, about 650 μm to 10,000 or more), such as hollow epoxy spheres, and hollow alumina spheres, and (vi) closed cell foam, such as epoxy foam. Such second porous materials are commercially available. In some examples, the closed cell foam can be prepared using a high internal phase emulsion (HIPE) or be prepared using a gas (e.g., $CO_2$, $N_2$) dissolved at high pressure, then reducing the pressure to form bubbles.

The porous material with the smaller length scale (e.g., smaller holes) is packed in between elements of the porous material with the larger length scale (e.g., larger holes), thus resulting in a hierarchical buoyant material having a higher packing fraction for the combined first and second porous materials than for either the first or second porous material alone. For example, wherein the first porous material has a smaller linear length scale than the second linear length scale of the second porous material, the first porous material is packed in between the second porous material. In another example, wherein the second porous material has a smaller linear length scale than the first linear length scale of the first porous material, the second porous material is packed in between the first porous material. In a further example, wherein the first porous material has a larger linear length scale than the second linear length scale of the second porous material, the second porous material is packed in between the first porous material. In yet another example, wherein the second porous material has a larger linear length scale than the first linear length scale of the first porous material, the first porous material is packed in between the second porous material.

In some examples, the second porous material is formed in place. When the second porous material is smaller than the first porous material, a pore-forming solvent can be mixed into epoxy or other appropriate resin. In one example, the pore forming solvent can be a silicone such as cyclomethicone. The combination of epoxy and pore forming solvent can be combined with hollow glass microspheres. The combination can be formed by (1) mixing epoxy and pore forming solvent with the hollow glass microspheres together and compressing the mixture or (2) infiltrating, via gravity-, capillary-, pressure-, or vacuum-assisted infiltration, the epoxy/pore forming solvent into a bed of hollow-glass microspheres. One can then allow pore forming solvent to phase separate from the epoxy. Separation can occur with time or temperature for silicones. The epoxy can be cured and the pore forming solvent removed, for example, via diffusion and evaporation out of the pores.

Alternately, epoxy (e.g., an epoxy-amine resin including an epoxy-amine crosslinked polymer, or an epoxy-anhydride resin), polyurethane, or other appropriate resin, can be combined with hollow glass microspheres where the combination is (1) mixed and compressed or (2) infiltrated by, for example, gravity-, capillary-, pressure-, or vacuum-assisted infiltration of the epoxy into a bed of hollow-glass microspheres. The pore forming solvent can be diffused into the epoxy (e.g., $CO_2$ at high pressure). The pore forming solvent is allowed to phase separate from the epoxy and possibly expand (e.g., by reducing the pressure for $CO_2$) followed by curing the epoxy. The pore forming solvent can optionally be removed (e.g., via diffusion out of the pores).

When the second porous material has a length scale larger than the first porous material, options to produce the product include, but are not limited to:

(A) Sacrificial balls (e.g., expanded polystyrene spheres) are rolled the in a shell-forming liquid (e.g., pre-ceramic polymer or ceramic adhesive) to coat balls. The balls are removed and the shell is cured (e.g., thermal or UV cure). The core can optionally be removed by heating in an oxygen containing environment; or (B) Core-shell droplets are formed with a shell-forming liquid (e.g., pre-ceramic polymer or ceramic adhesive) in the shell phase of the core-shell droplets. The core can be vapor or liquid. The matrix can be gas, such as, for example, air, $N_2$, or the like, or a liquid such as a UV cure system, for example, a polymer-monomer (e.g., polyacrylate, thiolene precursor, molten polymer, or the like). In some examples, formation can utilize concentric nozzles, coaxial needles, microfluidic droplet generation, spray drying, double emulsion. The product can then be cured (e.g., thermal, UV, or chemical curing) and if the core is liquid, the liquid can be diffused from the core; or (C) Formation of the porous material may occur using interfacial polymerization. Droplets of inert phase can be formed in a pre-ceramic polymer containing matrix liquid phase. The inert phase can optionally contain a polymerization catalyst. The preceramic polymer can then be selectively polymerized at the interface of the droplets and the matrix. The core liquid can diffuse or be washed out of the core; or (D) Formation of the porous material can use a roto-mold process.

In other processes, the at least two porous materials (e.g., the first and second porous materials) can be placed in a mold which is infiltrated with epoxy. Shaking or vibration can optionally be used to improve the dispersion of the at least two porous materials. Compression can be used along with curing the epoxy.

In yet other processes, epoxy can be infiltrated into a bed of the at least two porous materials. The mixture can then be compressed and the epoxy cured.

In some aspects, the second porous material 15 can be surface treated to resist the infiltration of water. In some examples, the surface treatment can by hydrophobic or (hydrophobic and oleophobic). In certain examples, the surface treatment can be from alkoxysilane, chlorosilanes, fluorinated alkoxysilanes, or fluorinated chlorosilanes. In other examples, the surface treatment can be from alkoxytitanates, alkoxyzirconates, and fluorinated versions thereof.

The hierarchical buoyant of the present disclosure may comprise one or more additional porous materials, each independently characterized by a linear length scale. In some examples, the hierarchical buoyant material of the disclosure can include a third porous material, which comprises elements characterized by a third linear length scale that is substantially different than the first and second linear length scales of the first and second porous materials, respectively. The third linear length scale may be substantially different from the first and second linear length scales in size, e.g., diameter, length, or distance. The third linear length scale of the third porous material is either substantially larger, for example, at least 5 times greater or at least 10 times greater than the linear length scale of the larger of the first and second porous materials, or substantially smaller, for example, at least 5 times smaller or at least 10 times smaller than the linear length scale of the smaller of the first and second porous materials. The density of the third porous material is less than 1 g/cm$^3$. In some examples the density is less than 0.7 g/cm$^3$, or less than 0.4 g/cm$^3$. The third porous material can be packed between the first and second porous to further reduce density, provide higher specific strength, and improve buoyancy per unit volume.

The hierarchical buoyant material of the present disclosure may further comprise a continuous phase matrix. The first porous material and the second porous material can be disposed within the continuous phase matrix. The continuous phase matrix can serve to bond the elements of the first porous materials together, to bond the elements of the second porous materials to each other, and to bond elements of the first porous material to elements of the second porous material. The continuous phase matrix does not significantly penetrate either of the first porous material or the second porous material. The continuous phase matrix may include, but is not limited to, an epoxy. In some examples, the continuous phase matrix can be omitted if one of the porous materials is formed in place around the other one (e.g., for a formed in place ultrafine pore closed-cell foam). The term "bond" or "bonding", as used herein, refers to the holding together of components.

The hierarchical buoyant material has a density <1 g/cm$^3$, <0.8 g/cm$^3$, <0.6 g/cm$^3$, or <0.35 g/cm$^3$. However, tuning of this metric can be a function of the service depth where a device employing the hierarchical buoyant materials will be deployed.

The hierarchical buoyant materials of the present disclosure improve upon known syntactic foam made of hollow glass microspheres and epoxy, which has porosity at a single length scale (the state-of-the-art (SoA) buoyancy material). The packing density of the lightest component of known syntactic foam, e.g., the hollow glass microspheres, is limited to about 60-70% by geometrical arrangements/architecture, and the remainder of the volume is occupied by fully dense epoxy. However, the hierarchical buoyant materials of the present disclosure having a porous hierarchy that spans multiple length scales wherein the porous material with the smaller length scale (e.g., smaller holes) is packed in between elements of the porous material with the larger length scale (e.g., larger holes), allows 70-90% packing fraction of multiple lightweight elements or components. The higher packing fraction of multiple lightweight elements results in a reduction in density for the same isostatic compressive strength, thereby providing greater buoyancy per unit volume when compared to known syntactic foam. The hierarchical buoyant material of the present disclosure can have improved buoyancy of, for example, at least 10%, at least 20%, or at least 30% when compared to known syntactic foam.

The disclosure also concerns production of the hierarchical buoyant material. Methods include providing a first porous material which comprises elements characterized by having a first linear length scale, and comprising hollow microspheres; providing a second porous material which comprises elements characterized by having a second linear length scale, wherein the second linear length scale is substantially different than the first linear length scale, and the second porous material has a size that is either smaller or larger than the first porous material; and packing the first or second porous material having a smaller linear length scale between the other of the first or second porous material having a larger linear length scale. The combined first and second porous materials form the hierarchical buoyant material and the hierarchical buoyant material has a higher packing fraction than either the first porous material or the second porous material alone.

To prepare the first porous material, the components for the first and second porous materials are obtained from commercially available sources or made by conventional methods. For example, (i) hollow glass microspheres can be purchased from 3M™, (ii) mesoporous silica (e.g., SBA-15, FDU-12, or MCM-48), can be purchased from Sigma-Aldrich or ACS Material, (iii) metal-organic frameworks (MOF) can be purchased from BASF™ or SIGMA-ALDRICH™, (vi) zeolite can be purchased from Sigma Aldrich™, (vii) ultrafine pore closed-cell foam can be made by physical foaming with $CO_2$ as described in J. Appl. Polym. Sci. 2014, DOI: 10.1002/APP.41293, the entire contents of which are incorporated herein by reference, or by using a variation of chemical gas generation from decomposition of a precursor as disclosed in Adv. Mater. 2018, 30, 1703992, the entire contents of which are incorporated herein by reference, (viii) larger hollow spheres (e.g., having a diameter of about 100 μm to about 10,000 μm or more, or about 300 μm to about 10,000 μm or more, about 650 μm to 10,000 or more) can be made through multiple methods as described in Section 2.8 in Cellular Ceramics: Structure, Manufacturing, Properties and Applications. Michael Scheffler, Paolo Colombo (Eds.) Copyright_2005 WILEY-VCH Verlag GmbH & Co. KGaA, Weinheim ISBN: 3-527-31320-6, the entire contents of which are incorporated herein by reference.

The larger hollow spheres can also be made by using air filled droplets generated by coaxial nozzles. The liquid around the air is a preceramic resin that is cured into a green state with heat or UV light and then converted to a ceramic at high temperature.

Another method for making larger hollow spheres employs coating expanded polystyrene foam beads with a preceramic polymer in a rolling mill system, optionally covering the surface of the preceramic polymer on the beads with a ceramic powder, and heating the beads to cure the preceramic polymer and convert it into a ceramic shell. If heating occurs in air, the foam beads are converted to $CO_2$ gas.

The hollow spheres to be employed for the first porous material and the second porous material are sorted/classified to create two or more distinct size distributions. The hollow spheres can be placed in water and the floating hollow spheres separated from the hollow spheres that sink. Only the floating hollow spheres (which float because they are intact) are used. The hollow spheres that sink (because they have a hole or are otherwise malformed or broken) are discarded.

Before sorting floaters and sinkers, the hollow spheres can be subjected to external pressure and then the pressure could be relieved. This breaks the weaker hollow spheres, thus enabling the floater/sinker sorting to keep only higher strength hollow spheres.

Methods for combining the first and second porous materials include the following.

Method 1: The first and second porous materials are mixed and placed in a mold. The mold is agitated to cause the first and second materials to pack into a structure with the smaller material packing between the spaces between the larger material. Then a polymer matrix is infiltrated into the open space around the first and second materials by, for example, gravity-, capillary-, pressure-, or vacuum-assisted infiltration, or using positive pressure to force the polymer around the first and second material. The polymer is then optionally cured with heat.

Method 2: The larger of the first and second material is placed in a mold for the final part, and the mold is agitated to cause the material to pack into a structure with minimized free space. Then a polymer matrix is mixed with the smaller of the first and second material, and this mixture is infiltrated into the open space around the larger of the first and second material infiltrated by, for example, gravity-, capillary-, pressure-, or vacuum-assisted infiltration to force the polymer around the larger of the first and second material. The polymer is then optionally cured with heat.

Turning now to the figures, FIG. 1, in accordance with one or more examples, this figure presents a schematic of one example of a hierarchical buoyant material 10 which employs hollow glass microspheres 20 as the first porous material 5 (see FIG. 7), and mesoporous silica 30 as the second porous material 15 (see FIG. 7). In this example, the second porous material, e.g., the mesoporous silica 30, has the smaller length scale (e.g., smaller holes) and is packed in between the first porous material, e.g., the hollow glass microspheres 20, having the larger length scale (e.g., larger holes). This example is one where an additional continuous phase matrix 25 (shown in FIG. 7) is omitted.

FIG. 2 presents a cross-section schematic of one example of a hierarchical buoyant material 10 having hollow glass microspheres 20 as the first porous material 5 (see FIG. 7), mesoporous silica 30 as the second porous material 15, and an epoxy matrix 40 as a continuous phase matrix 25. In this example, the second porous material, e.g., the mesoporous silica 30, has the smaller length scale (e.g., smaller holes) and is packed in between the first porous material, e.g., the hollow glass microspheres 20, having the larger length scale (e.g., larger holes). Unlike FIG. 1, FIG. 2 includes the additional continuous phase matrix 25.

FIG. 3 illustrates one example of a hierarchical buoyant material 10 using hollow glass microspheres 20 as the first porous material 5 and hollow alumina spheres 50 as the second porous material 15. In this example, the first porous material, e.g., the hollow glass microspheres 20, has the smaller length scale (e.g., smaller holes) and is packed in between the second porous material, e.g., the hollow alumina spheres 50, having the larger length scale (e.g., larger holes). This example is one where an additional continuous phase matrix 25 is omitted.

FIG. 4 presents a schematic of another example of a hierarchical buoyant material 10 using hollow glass microspheres 20 as the first porous material 5, hollow alumina spheres 50 as the second porous material 15 and an epoxy matrix 40 as a continuous phase matrix 25. Unlike FIG. 3, FIG. 4 includes an additional material as the continuous phase matrix 25. In this example, the first porous material, e.g., the hollow glass microspheres 20, has the smaller length scale (e.g., smaller holes) and is packed in between the second porous material, e.g., the hollow alumina spheres 50, having the larger length scale (e.g., larger holes).

FIG. 5 is a schematic of another example of a hierarchical buoyant material 10 having hollow glass microspheres 20 as the first porous material 5 and ultrafine closed cell foam 60 as the second porous material 15. In this example, an additional continuous phase matrix 25 is omitted. In this example, the second porous material, e.g., the ultrafine closed-cell foam 60, has the smaller length scale (e.g., smaller holes) and is packed in between the first porous material, e.g., the hollow glass microspheres 20, having the larger length scale.

FIG. 6 illustrates a cross-section of a hierarchical buoyant material 10 having hollow glass microspheres 20 as the first porous material 5 and ultrafine closed cell foam 60 as the second porous material. In this example, the second porous material, e.g., the ultrafine closed-cell foam 60, has the smaller length scale (e.g., smaller holes) and is packed in between the first porous material, e.g., the hollow glass microspheres 20, having the larger length scale (e.g., larger holes).

FIG. 7 presents a schematic of a generic example of a hierarchical buoyant material 10 using a first porous material 5, a second porous material 15, and a continuous phase matrix 25. It should be noted that like some of the specific examples discussed above, a separate continuous phase matrix 25 can be omitted in some examples. In this example, the second porous material 15, has the smaller length scale (e.g., smaller holes) and is packed in between the first porous material 5, having the larger length scale (e.g., larger holes).

EXAMPLES

Various aspects of the present disclosure are further illustrated with respect to the following examples. It is to be understood that these examples are provided to illustrate specific embodiments of the present disclosure and should not be construed as limiting the scope of the present disclosure to any particular aspect.

Example 1: Adding Smaller Length Scale, i.e., Smaller Holes or Voids, with Polymer Matrix Hollow glass microspheres 20 (30-60 μm diameter), the first porous material having a larger length scale, are purchased from 3M™. Mesoporous silica 30 (e.g., SBA-15, FDU-12, or MCM-48) (<1/10 the diameter of the hollow glass spheres), the second porous material, is purchased from Sigma-Aldrich or ACS Material. The hollow spheres to be employed for the first porous material and the second porous material are subjected to external pressure and then the pressure is relieved which breaks the weaker hollow spheres. The hollow spheres are then placed in water and the floating hollow spheres are separated from the hollow spheres that sink. The hollow spheres that sink (because they have a hole or are otherwise malformed or broken) are discarded and the floating hollow spheres (which float because they are intact) are sorted/classified to create two or more distinct size distributions.

The hollow glass microspheres and the mesoporous silica are mixed and placed in a mold. The mold is agitated to cause the mesoporous silica having the smaller length scale (e.g., smaller holes) to be packed in between the hollow glass microspheres, having the larger length scale (e.g., larger holes). An epoxy matrix 40 is infiltrated into the open space of the mold around the hollow glass microspheres and the mesoporous silica mixture by vacuum-assisted infiltration. The mixture is then compressed and the epoxy cured with heat. The hierarchical buoyant material of Example 1 is illustrated in FIG. 8A.

Example 2: Adding Larger Length Scale, i.e., Larger Holes or Voids, with Polymer Matrix A hierarchical buoyant material according to Example 2 is made in the same manner as Example 1 except that alumina macrospheres 50 having a diameter >10× the diameter of the hollow glass microspheres 20 (30-60 μm diameter), are employed as the second porous material and have a larger length scale than the hollow glass microspheres. The hierarchical buoyant material of Example 2 is illustrated in FIG. 8B.

Example 3: Adding Smaller Length Scale, i.e., Smaller Holes or Voids, Closed-Cell Foam Hollow glass microspheres (30-60 μm diameter), the first porous material having the larger length scale, are purchased from 3M™. Ultrafine pore closed-cell foam, the second porous material having the smaller length scale, is made by physical foaming with $CO_2$ as described in J. Appl. Polym. Sci. 2014, DOI: 10.1002/APP.41293, and is formed in place and packed in between the hollow glass microspheres. The hierarchical material of Example 3 is similar to the hierarchical buoyant material illustrated in FIG. 5.

FIG. 9 shows a comparison of the predicted results of Examples 1, 2, and 3 which are bimodal hierarchical (i.e., having two levels of hierarchy) examples of the present disclosure, to the comparative examples listed in the Table below.

| Comparative Example | Material | Description |
|---|---|---|
| ESS | Engineered Syntactic Systems Foams | Commercially available comparative foams. |
| SoA: | State-of the-Art (SoA) Syntactic Foam | Conventional syntactic foam made of hollow glass microspheres and an epoxy matrix. |
| EGM | Etched Glass Microspheres | Hollow glass microspheres are chemically etched. |
| EAS | Etched Alumina Spheres | Hollow alumina spheres are chemically etched. |

The Factor of Safety (FOS) to be used to calculate service depth from the isotactic crush strength is 1.5.

The results show that the hierarchical buoyant materials of Example 1 (hollow glass microspheres+mesoporous silica/epoxy and Example 2 (alumina macrospheres+hollow glass spheres/epoxy) of the present disclosure are predicted to have significantly improved buoyancy per volume over the same comparable service depth range as SoA (conventional syntactic foam made of hollow glass microspheres 20 and an epoxy matrix 40, which has porosity at a single length scale (the state-of-the-art buoyancy material, illustrated in FIG. 8C), ESS (Commercially available comparative Engineered Syntactic Systems Foams, MZ, BZ, AZ, & HZ Grades), and EAS (etched alumina spheres). Additionally, Example 3 (hollow glass microspheres+ultrafine closed cell foam) of the present disclosure is predicted to have a significantly improved buoyancy per volume as compared to EGM (etched glass microspheres) and EAS (etched alumina spheres) at more shallow depths. Thinning the walls of the glass and alumina spheres to a predetermined thickness to diameter (t/D) ratio and desired mechanical strength depending on the depth of service can extend the performance at more shallow depths. Therefore, it is expected that etched glass spheres and etched alumina spheres would be useful in the hierarchical buoyant materials of the present disclosure.

The hierarchical buoyant materials of the present disclosure have a porous hierarchy that spans multiple length scales such that the porous material with the smaller length scale (e.g., smaller holes) is packed in between elements of the porous material with the larger length scale (e.g., larger holes). Due to the hierarchical structure of the buoyant materials of the present disclosure the void fraction is increased allowing for 70-90% packing fraction compared to about 60-70% packing fraction for known syntactic foam. The higher packing fraction of multiple lightweight elements of the hierarchical buoyant material of the present disclosure results in a reduction in density for the same isostatic compressive strength, thereby providing greater buoyancy per unit volume of, for example, at least 10%, at least 20%, or at least 30% when compared to known syntactic foam when compared to known syntactic foam.

As used herein, the following terms have the following meanings unless expressly stated to the contrary.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

When values are expressed as approximations, by use of the antecedent "about," it will be understood that the particular value forms another example.

All ranges are inclusive and combinable. In addition, when a range is recited, it is contemplated that all values within the range, including end points, are combinable in all possible combinations.

The terms "first", "second", "third", etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

As used herein, the terms "for example," "for instance," "such as," "e.g.,", "include" or "including" are meant to introduce examples that further clarify more general subject matter. Unless otherwise specified, these examples are provided only as an aid for understanding the applications illustrated in the present disclosure, and are not meant to be limiting in any fashion.

Further, the disclosure comprises additional notes and examples as detailed in the following clauses set forth below.

Clause 1. A hierarchical buoyant material comprising:

a first porous material which comprises elements characterized by having a first linear length scale, and comprising hollow microspheres;

a second porous material which comprises elements characterized by having a second linear length scale, wherein the second linear length scale is substantially different than the first linear length scale, and the second porous material has a size that is either smaller or larger than the first porous material; and the first or second porous material having a smaller linear length scale is packed between the other of the first or second porous material having a larger linear length scale, wherein the hierarchical buoyant material has a higher packing fraction than either the first porous material or the second porous material alone.

Clause 2. The hierarchical buoyant material of clause 1, wherein the first porous material has a diameter of about 5 to about 120 microns.

Clause 3. The hierarchical buoyant material of clause 1 or 2, wherein the hollow microspheres comprise glass, ceramic, or a polymer or copolymer.

Clause 4. The hierarchical buoyant material of any one of clauses 1-3, wherein the hollow microspheres comprise glass selected from the group consisting of silicon dioxide glass, soda-lime glass, borosilicate glass, and combinations thereof.

Clause 5. The hierarchical buoyant material of any one of clauses 1-4, wherein the hollow microspheres are ceramic microspheres comprising a ceramic particulate filler and a ceramic matrix around the filler.

Clause 6. The hierarchical buoyant material of any one of clauses 1-5 wherein the second linear length scale of the second porous material is at least 5 times larger or at least 5 times smaller than the first linear length scale of the first porous material.

Clause 7. The hierarchical buoyant material of any one of clauses 1-6, wherein the second linear length scale of the second porous material is at least 10 times larger or at least 10 times smaller than the first linear length scale of the first porous material.

Clause 8. The hierarchical buoyant material of any one of clauses 1-7, wherein the second porous material has a smaller linear length scale than the first porous material and has a diameter of 10 nm to about 15 μm.

Clause 9. The hierarchical buoyant material of any one of clauses 1-8, wherein the second porous material has a smaller linear length scale than the first porous material and has a diameter of about 10 nm to about 2 μm.

Clause 10. The hierarchical buoyant material of any one of clauses 1-9, wherein the second porous material has a larger linear length scale than the first porous material and has a diameter of about 100 μm to about 10,000 μm.

Clause 11. The hierarchical buoyant material of any one of clauses 1-10, wherein the second porous material has a larger linear length scale than the first porous material has a diameter of about 300 μm to about 10,000 μm.

Clause 12. The hierarchical buoyant material of any one of clauses 1-11, wherein the second porous material has a larger linear length scale than the first porous material has a diameter of about 650 μm to about 10,000 μm.

Clause 13. The hierarchical buoyant material of any one of clauses 1-12, further comprising a continuous phase matrix, the first porous material and the second porous material being disposed within said continuous phase matrix, wherein the continuous phase matrix serves to bond the first and second porous materials to each other.

Clause 14. The hierarchical buoyant material of clause 13, wherein the continuous phase matrix includes an epoxy and does not significantly penetrate either of the first porous material or the second porous material.

Clause 15. The hierarchical buoyant material of any one of clauses 1-14, wherein the second porous material comprises hollow spheres or bubbles, open-cell pore volumes that are capillarily inaccessible to a continuous phase matrix, or closed-cell pore volumes.

Clause 16. The hierarchical buoyant material of anyone of clauses 1-15, wherein the second porous material comprises mesoporous silica, metal-organic framework (MOF) zeolite, ultrafine closed-cell foam, or large hollow spheres.

Clause 17. The hierarchical buoyant material of any one of clauses 1-16, wherein the second porous material is surface treated to resist infiltration of water.

Clause 18. The hierarchical buoyant material of clause 17, wherein a surface treatment is hydrophobic, or hydrophobic and oleophobic.

Clause 19. The hierarchical buoyant material of any one of clauses 1-18, additionally comprising a third porous material comprising elements characterized by a third linear length scale that is substantially different than the first and second linear length scales of the first and second porous materials, respectively.

Clause 20. The hierarchical buoyant material of any one of claims 1-19, having a density of less than 1 gram per cubic centimeter (<1 g/cm$^3$), Clause 21. The hierarchical buoyant material of any one of claims 1-19, having a density of less than 0.8 gram per cubic centimeter (<0.8 g/cm$^3$).

Clause 22. The hierarchical buoyant material of any one of claims 1-21, having a density of less than 0.6 gram per cubic centimeter (<0.6 g/cm$^3$).

Clause 23. The hierarchical buoyant material of any one of claims 1-22, having a density of less than 0.35 gram per cubic centimeter (<0.35 g/cm$^3$).

Clause 24. The hierarchical buoyant material of any one of claims 1-23, having improved buoyancy of at least 10% per unit volume.

Clause 25. The hierarchical buoyant material of any one of claims 1-24, having improved buoyancy of at least 20% per unit volume.

Clause 26. The hierarchical buoyant material of any one of claims 1-25, having improved buoyancy of at least 30% per unit volume.

Clause 27. A method of fabricating a hierarchical buoyant material comprising:

providing a first porous material which comprises elements characterized by having a first linear length scale, and comprising hollow microspheres;

providing a second porous material which comprises elements characterized by having a second linear length scale, wherein the second linear length scale is substantially different than the first linear length scale, and the second porous material has a size that is either smaller or larger than the first porous material; and packing the first or second porous material having a smaller linear length scale between the other of the first or second porous material having a larger linear length scale resulting in the hierarchical buoyant material having a higher packing fraction than either the first porous material or the second porous material alone.

Clause 28. The method of clause 27, wherein the hollow microspheres comprise glass, ceramic, or a polymer or copolymer.

Clause 29. The method of clause 27 or 28, wherein the hollow microspheres comprise glass selected from the group consisting of silicon dioxide glass, soda-lime glass, borosilicate glass, and combinations thereof.

Clause 30. The method of any one of clauses 27-29, wherein the hollow microspheres are ceramic microspheres comprising a ceramic particulate filler and a ceramic matrix around the filler.

Clause 31. The method of any one of clauses 27-30, wherein the second linear length scale of the second porous material is at least 5 times larger or at least 5 times smaller than the first linear length scale of the first porous material.

Clause 32. The method of any one of clauses 27-31, wherein the second linear length scale of the second porous material is at least 10 times larger or at least 10 times smaller than the first linear length scale of the first porous material.

Clause 33. The method of any one of clauses 27-32, wherein the second porous material has a smaller linear length scale than the first porous material and has a diameter of 10 nm to about 15 μm.

Clause 34. The method of any one of clauses 27-33, wherein the second porous material has a smaller linear length scale than the first porous material and has a diameter of about 10 nm to about 2 μm.

Clause 35. The method of any one of clauses 27-34, wherein the second porous material has a larger linear length scale than the first porous material and has a diameter of about 100 μm to about 10,000 μm.

Clause 36. The method of any one of clauses 27-35, wherein the second porous material has a larger linear length scale than the first porous material has a diameter of about 300 μm to about 10,000 μm.

Clause 37. The method of any one of clauses 27-36, wherein the second porous material has a larger linear length scale than the first porous material has a diameter of about 650 μm to about 10,000 μm.

Clause 38. The method of any one of clauses 27-37, further comprising: providing a continuous phase matrix, wherein the first porous material and the second porous material are disposed within said continuous phase matrix wherein the continuous phase matrix serves to bond the first and second porous materials from each other.

Clause 39. The method of clause 38, wherein the continuous phase matrix includes an epoxy and does not significantly penetrate either of the first porous material or the second porous material.

Clause 40. The method of any one of clauses 27-38, wherein the second porous material comprises hollow spheres or bubbles, open-cell pore volumes that are capillarily inaccessible to a continuous phase matrix or closed-cell pore volumes.

Clause 41. The method of anyone of clauses 27-40, wherein the second porous material comprises mesoporous silica, metal-organic framework (MOF), zeolite, ultrafine closed-cell foam, or large hollow spheres.

Clause 42. The method of any one of clauses 27-41, further comprising applying a surface treatment to the second porous material to resist infiltration of water.

Clause 43. The method of clause 42, wherein the surface treatment is hydrophobic, or hydrophobic and oleophobic.

Clause 44. The method of any one of clauses 27-43, additionally comprising a third porous material comprising elements characterized by a third linear length scale that is substantially different than the first and second linear length scales of the first and second porous materials, respectively.

Clause 45. The method of any one of claims 27-44, wherein the hierarchical buoyant material has a density of less than 1 gram per cubic centimeter (<1 g/cm$^3$).

Clause 46. The method of any one of claims 27-45, wherein the hierarchical buoyant material has a density of less than 0.8 gram per cubic centimeter (<0.8 g/cm$^3$).

Clause 47. The method of any one of claims 27-46, wherein the hierarchical buoyant material has a density of less than 0.6 gram per cubic centimeter (<0.6 g/cm$^3$).

Clause 48. The method of any one of claims 27-47, wherein the hierarchical buoyant material has a density of less than 0.35 gram per cubic centimeter (<0.35 g/cm$^3$).

Clause 49. The method of any one of claims 27-48, wherein the hierarchical buoyant material has improved buoyancy of at least 10% per unit volume.

Clause 50. The method of any one of claims 27-49, wherein the hierarchical buoyant material has improved buoyancy of at least 20% per unit volume.

Clause 51. The method of any one of claims 27-50, wherein the hierarchical buoyant material has improved buoyancy of at least 30% per unit volume.

Those skilled in the art will appreciate from the foregoing description that the broad techniques of the embodiments of the present disclosure can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A hierarchical buoyant material comprising:

a first porous material which comprises elements characterized by having a first linear length scale, and comprising hollow microspheres;

a second porous material which comprises elements characterized by having a second linear length scale, wherein the second linear length scale is substantially different than the first linear length scale, and the second porous material has a size that is either smaller or larger than the first porous material; and a third porous material comprising elements characterized by a third linear length scale that is at least ten times smaller than the smaller of the first linear length scale and the second linear length scale, the third porous material having a density of less than 1 gram per cubic centimeter, wherein:

the first or second porous material having a smaller linear length scale is packed between the other of the first or second porous material having a larger linear length scale;

the third porous material is packed between the first and second porous material; and wherein the hierarchical buoyant material has a higher packing fraction than either the first porous material or the second porous material alone.

2. The hierarchical buoyant material of claim 1, wherein the first porous material has a diameter of about 5 to about 120 microns.

3. The hierarchical buoyant material of claim 1, wherein the hollow microspheres comprise glass, ceramic, or a polymer or copolymer.

4. The hierarchical buoyant material of claim 1, wherein the second linear length scale of the second porous material is at least 5 times larger or at least 5 times smaller than the first linear length scale of the first porous material.

5. The hierarchical buoyant material of claim 1, wherein the second linear length scale of the second porous material is at least 10 times larger or at least 10 times smaller than the first linear length scale of the first porous material.

6. The hierarchical buoyant material of claim 1, wherein the second porous material has a smaller linear length scale than the first porous material and has a diameter of 10 nm to about 15 μm.

7. The hierarchical buoyant material of claim 1, wherein the second porous material has a smaller linear length scale than the first porous material and has a diameter of about 10 nm to about 2 μm.

8. The hierarchical buoyant material of claim 1, wherein the second porous material has a larger linear length scale than the first porous material and has a diameter of about 100 μm to about 10,000 μm.

9. The hierarchical buoyant material of claim 1, wherein the second porous material has a larger linear length scale than the first porous material has a diameter of about 300 μm to about 10,000 μm.

10. The hierarchical buoyant material of claim 1, wherein the second porous material has a larger linear length scale than the first porous material has a diameter of about 650 μm to about 10,000 μm.

11. The hierarchical buoyant material of claim 1, further comprising a continuous phase matrix, the first porous material and the second porous material being disposed within said continuous phase matrix, wherein the continuous phase matrix serves to bond the first and second porous materials to each other.

12. The hierarchical buoyant material of claim 11, wherein the continuous phase matrix includes an epoxy and does not significantly penetrate either of the first porous material or the second porous material.

13. The hierarchical buoyant material of claim 1, wherein the second porous material comprises mesoporous silica, metal-organic framework (MOF), zeolite, ultrafine closed-cell foam, or large hollow spheres.

14. The hierarchical buoyant material of claim 1, wherein the second porous material comprises hollow spheres or bubbles, open-cell pore volumes that are capillarily inaccessible to a continuous phase matrix, or closed-cell pore volumes.

15. A method of fabricating a hierarchical buoyant material comprising:

providing a first porous material which comprises elements characterized by having a first linear length scale, and comprising hollow microspheres;

providing a second porous material which comprises elements characterized by having a second linear length scale, wherein the second linear length scale is substantially different than the first linear length scale, and the second porous material has a size that is either smaller or larger than the first porous material;

providing a third porous material comprising elements characterized by a third linear length scale that is at least ten times smaller than the smaller of the first linear length scale and the second linear length scale, the third porous material having a density of less than 1 gram per cubic centimeter;

packing the first or second porous material having a smaller linear length scale between the other of the first or second porous material having a larger linear length scale resulting in the hierarchical buoyant material having a higher packing fraction than either the first porous material or the second porous material alone; and packing the third porous material between the first and second porous material.

16. The method of claim 15, further comprising:

providing a continuous phase matrix, wherein the first porous material and the second porous material are disposed within said continuous phase matrix wherein the continuous phase matrix serves to bond the first and second porous materials from each other.

17. The method of claim 16, wherein the continuous phase matrix includes an epoxy and does not significantly penetrate either of the first porous material or the second porous material.

18. The method of claim 15, wherein the hollow microspheres comprise glass, ceramic, or a polymer or copolymer, and have a diameter of about 5 to about 120 microns, and the second porous material may be formed of hollow spheres or bubbles, open-cell pore volumes that are capillarily inaccessible to a continuous phase matrix, or closed-cell pore volumes.

19. The method of claim 15, wherein the second porous material has a linear length scale of at least 5 times larger or at least 5 times smaller than the first porous material.

20. The hierarchical buoyant material of claim 4, wherein the second porous material is arranged in a cubic lattice arrangement.

* * * * *